(12) United States Patent
Muramatsu et al.

(10) Patent No.: US 12,390,718 B2
(45) Date of Patent: Aug. 19, 2025

(54) GAME MACHINE CONTROLLER

(71) Applicant: HORI CO., LTD., Yokohama (JP)

(72) Inventors: Hiroaki Muramatsu, Kanagawa (JP); Koichiro Amano, Kanagawa (JP); Shota Uchiyama, Kanagawa (JP)

(73) Assignee: HORI CO., LTD, Kanagawa (JP)

( * ) Notice: Subject to any disclaimer, the term of this patent is extended or adjusted under 35 U.S.C. 154(b) by 309 days.

(21) Appl. No.: 18/044,564

(22) PCT Filed: Oct. 15, 2020

(86) PCT No.: PCT/JP2020/038897
§ 371 (c)(1),
(2) Date: Mar. 8, 2023

(87) PCT Pub. No.: WO2022/079851
PCT Pub. Date: Apr. 21, 2022

(65) Prior Publication Data
US 2023/0347238 A1    Nov. 2, 2023

(51) Int. Cl.
*A63F 13/24*    (2014.01)
*A63F 13/235*    (2014.01)

(52) U.S. Cl.
CPC ............ *A63F 13/24* (2014.09); *A63F 13/235* (2014.09)

(58) Field of Classification Search
CPC ......... A63F 13/24; A63F 13/235; A63F 13/22
See application file for complete search history.

(56) References Cited

U.S. PATENT DOCUMENTS

| | | | |
|---|---|---|---|
| 2009/0050464 A1* | 2/2009 | Otani | H01H 1/06 200/6 A |
| 2012/0142418 A1* | 6/2012 | Muramatsu | A63F 13/24 463/37 |
| 2021/0197081 A1* | 7/2021 | Morita | A63F 13/218 |

FOREIGN PATENT DOCUMENTS

| | | |
|---|---|---|
| JP | 2009-054307 A | 3/2009 |
| JP | 2012-055339 A | 3/2012 |
| JP | 2018-067134 A | 4/2018 |
| WO | 2019244995 A1 | 12/2019 |

OTHER PUBLICATIONS

International Search Report for PCT/JP2020/038897 dated Dec. 28, 2020.

* cited by examiner

*Primary Examiner* — Peter J Iannuzzi
(74) *Attorney, Agent, or Firm* — PK PATENT LAW

(57) ABSTRACT

A controller including a cross key pad is improved so that an erroneous input relating to inputs from the cross key pad is suppressed. In a casing of the controller, a pressing portion is positioned at each of four distal ends of the cross key pad. Directly below each pressing portion, a pressing amount detection sensor which outputs 256 levels of pressing amount data corresponding to a pressing amount of the pressing portion is provided. The controller includes a threshold value recording module (223) in which a threshold value, which is a reference for recognizing that there has been a press when each pressing portion is pressed, is recorded in association with the pressing portion. When the pressing portion is pressed and the pressing amount data is input to a determination module (224), the determination module (224) allows generation of operation data based on the pressing amount data only when the pressing amount (Continued)

identified by the pressing amount data is equal to or more than the corresponding threshold value.

5 Claims, 8 Drawing Sheets

PLEASE SET ALL THRESHOLD VALUES TO
BETWEEN 0 TO 255

UP : 0 5 1

UPPER LEFT
UP : 1 7 5
LEFT : 1 8 5

UPPER RIGHT
UP : 1 7 0
RIGHT : 1 6 0

LEFT : 0 6 2

RIGHT : 0 4 0

LOWER LEFT
DOWN : 1 5 5
LEFT : 1 5 0

LOWER RIGHT
DOWN : 1 6 0
RIGHT : 1 5 2

DOWN : 0 4 0

UPPER RIGHT
    UP : 1 7 0
    RIGHT : 1 6 0

RIGHT : 0 4 0

LOWER RIGHT
    DOWN : 1 6 0
    RIGHT : 1 5 2

DOWN : 0 4 0

LOWER LEFT
    DOWN : 1 5 5
    LEFT : 1 5 0

LEFT : 0 6 2

UPPER LEFT
    UP : 1 7 5
    LEFT : 1 8 5

FIG. 8

GAME MACHINE CONTROLLER

CROSS-REFERENCE TO RELATED APPLICATIONS

This application is a national stage 35 U.S.C. 371 filing of International Application No. PCT/JP2020/038897, filed on Oct. 15, 2020. The entire contents of the aforementioned application are herein expressly incorporated by reference.

TECHNICAL FIELD

The present invention relates to a game machine controller for giving an input to, for example, a game machine.

BACKGROUND ART

Hitherto, a game machine for executing video games has been widely used. As used herein, "game machine" refers to both a single-purpose game machine dedicated to executing video games and a general-purpose personal computer or other computers capable of executing video games.

A controller is connected to the game machine.

Many controllers which are connected to a game machine have a cross key pad. The cross key pad includes keys having the shape of a cross, and has a function of giving inputs in four directions by pressing any one of four pressing portions at the distal ends of the keys having the shape of a cross. In many cases, the cross key pad is configured such that simultaneously pressing two adjacent pressing portions of the cross key pad enables inputs in the four diagonal directions between the pressing portions.

In other words, through use of the cross key pad, a user can give inputs in four directions or eight directions.

Most recent game machines receive the above-mentioned inputs in four directions or eight directions as digital inputs from the cross key pad.

That is, when the pressing portions of the cross key pad have been pressed, the controller generates data indicating, for example, that "there has been a right input," "there has been a left input," "there has been a lower-right input," or "there has been an upper-left input," and transmits the generated data to the game machine.

The determination by the controller that "there has been a right input," "there has been a left input," "there has been a lower-right input," or "there has been an upper-left input" is performed when a pressing amount with respect to the pressing portion of the controller exceeds an amount uniquely determined in advance.

SUMMARY OF INVENTION

Technical Problem

Incidentally, a video game to be executed on a game machine may require sequential inputs from the cross key pad. A typical example of this is the field of video games referred to as "fighting games," in which the user may be required to give rapid inputs, such as pressing an "A" button immediately after inputting left, down, left, down, and right in sequence on the cross key pad (for example, within 1.5 seconds), or pressing the "A" button immediately after inputting down, lower right, right, down, lower right, and right in sequence on the cross key pad. In the case of a fighting game, when the above-mentioned inputs are given correctly, a character in the video game played by the user may unleash a special skill determined in advance. In other words, whether or not rapid and correct inputs can be given on the cross key pad greatly determines whether or not the user can cause the character in the video game to perform an intended action.

For example, in a case in which left, down, left, down, and right are to be input in sequence on the cross key pad, when the second "down" input cannot be performed, the character in the video game does not give a planned special skill. As another example, in a case in which left, down, left, down, and right are to be input in sequence on the cross key pad, when a unrequired "left" input is performed between the second "left" and "down," the character in the video game does not give a planned special skill.

When the above-mentioned examples occur, that is, when the user cannot perform the intended input or performs an unintended input (those examples may be hereinafter collectively referred to as "erroneous input"), the user is not able to move the character in the video game as desired.

As a matter of course, this problem does not arise only in cases in which the video game is a fighting game, and the desire to prevent an erroneous input from the cross key pad is common for controllers including a cross key pad, regardless of the type of video game being executed on the game machine.

The invention of the subject application has an object to improve a controller including a cross key pad so as to suppress an erroneous input relating to inputs from the cross key pad.

Solution to Problem

The inventors of the subject application propose the following invention to achieve the above-mentioned object.

According to the invention of the subject application, there is provided a game machine controller including: a casing to be grasped by a user by a hand; a cross key pad mounted to the casing, the cross key pad including rod-shaped pressing members, each of the plurality of rod-shaped pressing members extending in one of four symmetrical directions from a predetermined point and being configured to receive an input when a pressing portion at a distal end thereof is pressed; a control module configured to generate, when any one of four of the pressing portions is pressed, ON data including position data for identifying the pressing portion which has been pressed; and an output module configured to output the ON data generated by the control module. The game machine controller is configured to be used in combination with a game machine configured to receive the ON data as an input from the cross key pad.

In other words, the invention of the subject application is a game machine controller (hereinafter sometimes simply referred to as "controller") including a cross key pad. As described above, "game machine" as used in the invention of the subject application includes a general-purpose personal computer capable of executing video games, other than a single-purpose game machine.

The game machine controller according to the invention of the subject application further includes: a pressing amount detection sensor provided on each of the pressing portions, the pressing amount detection sensor being configured to detect a pressing amount when the pressing portion is pressed and to generate pressing amount data which is data for identifying the pressing amount; and a threshold value recording module configured to record a threshold value set by the user for the pressing amount data in association with each of the pressing portions. The control module is configured to generate, based on pressing of one of the pressing portions, the ON data when the pressing amount data received from the pressing amount detection sensor provided in the pressing portion is equal to or more than the threshold value recorded in the threshold value recording module in association with the pressing portion corresponding to the pressing amount detection sensor which has generated the pressing amount data.

The control module included in the controller generates, when a pressing portion at a distal end of the four pressing members forming the cross key pad is pressed, ON data indicating that the pressing portion has been pressed. The ON data corresponds to the data "there has been a right input" and "there has been a left input" as described in the "Background Art" section. In other words, in the controller of the invention of the subject application, the data generated by the control module and transmitted from the output module to the game machine is the same data as described in the "Background Art" section. This is naturally the case because otherwise the game machine connected to the controller of the invention of the subject application cannot function properly.

However, the way in which the ON data is generated in the controller of the invention of the subject application is different from that in the controller as described in the "Background Art" section.

In the controller as described in the "Background Art" section, ON data is generated when the pressing amount for the pressing portion exceeds an amount uniquely determined in advance. In short, an electrical contact is provided under each of the four pressing portions of the cross key pad, and when a pressing portion is pressed down by a certain amount or more, the contact starts to conduct electricity (or stops conducting electricity). The ON data is generated in the controller as described in the "Background Art" section depending on a binary change (that is, whether the pressing portion has been pressed, or not been pressed, by a certain amount or more) caused by pressing down the pressing portion.

In contrast, with the controller of the invention of the subject application, the pressing amount detection sensor is provided on each of the four pressing portions of the cross key pad. The pressing amount detection sensor detects the pressing amount when the pressing portion is pressed, and generates pressing amount data, which is data for identifying the pressing amount. In other words, with the controller of the invention of the subject application, the pressing amount data is analog, or is at least generated as a value of a plurality of levels (for example, 256 levels of from 00 to FF in hexadecimal notation).

In addition, the controller of the invention of the subject application includes the threshold value recording module. The threshold value recording module records the threshold values for the pressing amount data set by the user.

Further, the control module is configured to generate, based on the pressing of one of the pressing portions, ON data when the pressing amount data received from the pressing amount detection sensor arranged in the pressed pressing portion is equal to or more than the threshold value recorded in the threshold value recording module in association with the pressing portion corresponding to the pressing amount detection sensor which has generated the pressing amount data.

In other words, the control module of the controller of the invention of the subject application is configured to generate the ON data only when, in a case in which pressing amount data has been generated based on the pressing of a pressing portion of the cross key pad by the user, the value of the pressing amount data exceeds the threshold value. Further, the threshold value can be set in accordance with the intention of the user. As a matter of course, when the threshold value is set to a low value, ON data is likely to be generated even when the pressing amount of the pressing portion is small, and when the threshold value is set to a high value, ON data is less likely to be generated even when the pressing amount of the pressing portion is large.

Therefore, according to the controller of the invention of the subject application, setting the threshold value to a low value prevents the user from not being able to input an intended input, and setting the threshold value to a high value prevents the user from inputting an unintended input. Each user has his or her own peculiar way in which the user operates the controller. With the controller that enables the threshold values to be set in consideration of this, users can obtain a controller that has been tuned specifically for the users and is less liable to cause an erroneous input from the cross key pad.

As described above, the controller of the invention of the subject application can suppress an erroneous operation when a single one of the four pressing portions is pressed, that is, an input is given in one of the four directions of up, down, left, and right, by setting a threshold value for the pressing amount data generated when only one of the four pressing portions of the cross key pad is pressed.

In addition, the controller of the invention of the subject application can suppress an erroneous operation when adjacent two of the four pressing portions are pressed simultaneously, that is, inputs are given in one of the four diagonal directions, by setting threshold values for the pressing amount data generated when adjacent two of the four pressing portions of the cross key pad are simultaneously pressed.

In this case, the control module is configured to generate, when two adjacent pressing portions of the cross key pad are pressed simultaneously, ON data including position data corresponding to a diagonal direction which is a direction between the two adjacent pressing portions. Further, the threshold value recording module is configured to record threshold values set by the user for four diagonal directions as a pair relating to the pressing amount data from two pressing amount detection sensors provided at positions sandwiching each of the four diagonal directions in association with the each of the four diagonal directions. In addition, the control module is configured to generate, based on simultaneous pressing of two adjacent pressing portions, the ON data for a diagonal direction when two pieces of pressing amount data received from the pressing amount detection sensor provided in each of the two adjacent pressing portions are equal to or more than both of the threshold values recorded in the threshold value recording module as a pair in association with the diagonal direction corresponding to the two adjacent pressing portions corresponding to the two pressing amount detection sensors which have generated the two pieces of pressing amount data.

For example, when the user attempts to give an upper right input, the user simultaneously presses the right pressing portion and the up pressing portion of the cross key pad. In this case, there may be a case in which a set of threshold values of 50 for right and 60 for up is recorded in the threshold value recording module as the threshold values for establishing an upper right input. When the user presses the right pressing portion and the up pressing portion on the cross key pad, the control module generates ON data for the upper right input only when the value identified by the pressing amount data generated by the right pressing amount detection sensor is 50 or more and the value identified by the pressing amount data generated by the up pressing amount detection sensor is 60 or more.

As a result, the user is less liable to make an erroneous input even for a diagonal direction input using the cross key pad.

As described above, the threshold value recording module records various threshold values or threshold value data set by the user.

Therefore, there may be an issue regarding how to record the threshold values in the threshold value recording module.

For example, the game machine controller of the invention of the subject application may further include a threshold value input device configured to record the threshold value in the threshold value recording module. The threshold value input device may be provided in the casing of the controller, for example. The controller includes input devices (for example, the above-mentioned cross key pad, push buttons, and analog sticks) for giving inputs regarding the video game to be executed on the game machine. Therefore, suitable such devices can function as the threshold value input device. When the input device of the controller is used to record the threshold values in the threshold value recording module, for example, an image for assisting the user in recording the threshold values in the threshold value recording module can be displayed on a display connected to the game machine based on a function of the game machine (or a function of a computer program installed in the game machine). The user can input various threshold values into the threshold value recording module by using the input device of the controller while viewing and being assisted by the image displayed on the display.

The controller may further include a wireless communication module configured to wirelessly receive data for recording the threshold value in the threshold value recording module, and the wireless communication module may be configured to receive the data for recording the threshold value in the threshold value recording module from a smartphone. This is an example of using a smartphone as a user interface for recording the threshold values in the threshold value recording module. For example, through connection of the smartphone and the controller via Bluetooth (trademark), which is a wireless communication standard, the data for recording the threshold values can be transmitted to the threshold value recording module from the smartphone to the controller. As a matter of course, even in this case, an image for assisting the user in recording the threshold values in the threshold value recording module can be displayed on a display of the smartphone based on a function of the smartphone or a function of a computer program installed in the smartphone.

The inventors of the subject application also propose a method to be executed by the control module of the controller as a mode of the invention of the subject application. The effects of the invention of that method are the same as the effects of the invention of the controller according to the subject application.

As an example, there is provided a method to be executed by a control module of a game machine controller, the game machine controller including: a casing to be grasped by a user by a hand; a cross key pad mounted to the casing, the cross key pad including rod-shaped pressing members, each of the plurality of rod-shaped pressing members extending in one of four symmetrical directions from a predetermined point and being configured to receive an input when a pressing portion at a distal end thereof is pressed; the control module configured to generate, when any one of four of the pressing portions is pressed, ON data including position data for identifying the pressing portion which has been pressed; an output module configured to output the ON data generated by the control module; a pressing amount detection sensor provided on each of the pressing portions, the pressing amount detection sensor being configured to detect a pressing amount of a press performed on the pressing portion and to generate pressing amount data which is data for identifying the pressing amount; and a threshold value recording module configured to record a threshold value set by the user for the pressing amount data in association with each of the pressing portions, the game machine controller being configured to be used in combination with a game machine configured to receive the ON data as an input from the cross key pad.

Further, the method includes the steps of: receiving, by the control module, the pressing amount from the pressing amount detection sensor provided in each of the pressing portions; and generating, by the control module, the ON data when the received pressing amount data is equal to or more than the threshold value recorded in the threshold value recording module in association with the pressing portion corresponding to the pressing amount detection sensor which has generated the pressing amount data.

BRIEF DESCRIPTION OF DRAWINGS

FIG. 7 is a diagram for illustrating an example of an image displayed on the display connected to the game machine when the setting mode is executed and all threshold values are set; and FIG. 8 is a diagram for schematically illustrating contents of data recorded in a threshold value recording module of the controller illustrated in FIG. 1.

DESCRIPTION OF EMBODIMENTS

Now, description is given of a preferred embodiment of the present invention with reference to the accompanying drawings.

Figure 1:
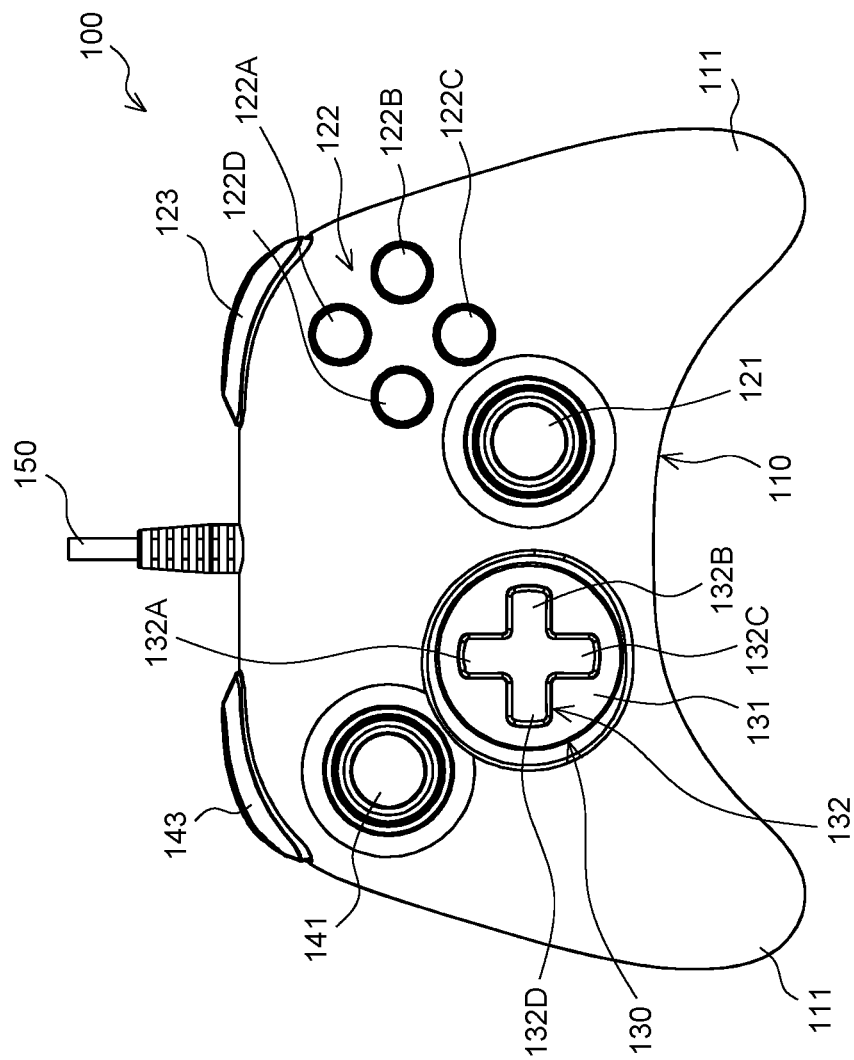
FIG. 1 is a plan view of a controller according to an embodiment of the present invention.

FIG. 1 is a plan view of a controller 100 according to the invention of the subject application.

The controller 100 is configured to give input data to a predetermined game machine capable of executing a game. The game machine may be a single-purpose game machine, or may be a home-use personal computer or other general-purpose computer capable of executing a game.

The single-purpose game machine is, for example, a home-use single-purpose game machine of a stationary type. For example, the game machine is PlayStation 4 (trademark)

manufactured and distributed by Sony Interactive Entertainment Inc. or Xbox One (trademark) manufactured and distributed by Microsoft Japan Co., Ltd.

The controller 100 may be of any type, but is required to have a cross key pad described later. The dominant design of the genuine controller used in combination with the game machine is almost determined, and most controllers have a cross key pad. The design of the controller 100 in this embodiment also basically follows such determined design, although not limited thereto.

Further, except for the pressing amount detection sensor, which is described later, of the cross key pad 132, the hardware configuration of the controller 100 can follow the hardware configuration of the publicly known controller or the well-known controller. In this embodiment, the hardware configuration of the publicly known controller or the well-known controller is employed, but the hardware configuration of the controller 100 is not limited thereto.

The controller 100 includes a casing which can be grasped by a user by a hand, and in this embodiment, includes an oblong casing 110 which can be grasped by the user with both hands, although not limited to this. On both the left and right front sides of the casing 110, grip portions 111 projecting toward the near side are formed so as to allow the user to easily grasp the controller by both hands. As is well known, the casing 110 is hollow. The casing 110 as well as components which are exposed from the casing 110 are all molded products made of resin in this embodiment, although not limited thereto.

At a lower part in a right side portion of the upper surface of the casing 110, there is provided a first stick input device 121 being an input device of a stick type. The first stick input device 121 is an input device having a lower end connected to the controller 100 and being configured to perform a pivot motion in all directions with the portion connected to the controller 100 as a support point. The user is allowed to give a desired input based on a tilt direction of the first stick input device 121.

At an upper part in the right side portion of the upper surface of the casing 110, there is provided a first push-button input module 122 of a push-button type including a set of four push buttons 122A, 122B, 122C, and 122D arranged at right, lower, upper, and left positions, respectively. All of the push buttons 122A, 122B, 122C, and 122D can be pressed with respect to the casing 110. The user can give an input, which exclusively relates to operation of a game, allocated to each of the push buttons 122A, 122B, 122C, and 122D by pressing freely selected one of the push buttons 122A, 122B, 122C, and 122D with respect to the casing 110. Although there is no clear boundary, the first push-button input module 122 corresponds to a predetermined area on a surface of the casing 110 which collectively surrounds the four push buttons 122A, 122B, 122C, and 122D and somewhat outer sides of those.

At the right side portion of the back surface of the casing 110, a trigger button 123 is provided. The trigger button 123 may be two buttons arranged in the up-and-down direction. The trigger button 123 can be pressed toward the near side with respect to the casing 110. The user can give an input, which exclusively relates to operation of a game, allocated to the trigger button 123 by pressing the trigger button 123 with respect to the casing 110.

All of the first stick input device 121, the four push buttons 122A, 122B, 122C, and 122D of the first push-button input module 122, and the trigger button 123 may be of the publicly known type or the well-known type. In this embodiment, such components of the publicly known type or the well-known type are employed.

A cross key pad member 130 is provided at a lower part in a left side portion of the upper surface of the casing 110. The cross key pad member 130 in this embodiment is, but not limited to, an integral piece made of resin.

The cross key pad member 130 in this embodiment includes a circular plate portion 131 which in this embodiment is a plate having a circular shape, although not limited to this. On the upper surface of the circular plate portion 131, there are provided rod-shaped pressing members 132A, 132B, 132C, and 132D each having, in this embodiment, a substantially rectangular cross section which extend in four symmetrical directions from the center of the circular plate portion 131 in this embodiment, although not limited thereto. In this embodiment, the pressing member 132A extends upward in FIG. 1 from the center of the circular plate portion 131, the pressing member 132B extends rightward, the pressing member 132C extends downward, and the pressing member 132D extends leftward. The base ends of the pressing members 132A, 132B, 132C, and 132D cross each other and are integrated. The member formed by the pressing members 132A, 132B, 132C, and 132D is the cross key pad 132 referred to in the invention of the subject application. Moreover, the distal ends of the pressing members 132A, 132B, 132C, and 132D are the four pressing portions of the cross key pad 132 referred to in the invention of the subject application.

The cross key pad member 130 is configured such that, in a state in which the circular plate portion 131 and the pressing members 132A, 132B, 132C, and 132D are integrated, the cross key pad member 130 can be tilted as a whole in all directions about the center of the circular plate portion 131 by a publicly known or well-known configuration. There is provided a pressing amount detection sensor, which is described later in detail, for detecting a pressing amount (distance for which the pressing portion is pressed down) when the pressing portion is pressed, for example, directly below each pressing portion in a state in which the cross key pad member 130 is not tilted. The user can give inputs in four directions from the cross key pad 132 by tilting the cross key pad 132 on the cross key pad member 130, that is, by pressing one of the pressing portions at the distal ends of the pressing members 132A, 132B, 132C, and 132D of the cross key pad 132 to cause only one of the pressing amount detection sensors to react. In this embodiment, although not limited thereto, the user can give inputs from the cross key pad 132 in four diagonal directions between two adjacent pressing portions that have been pressed by tilting the cross key pad 132 on the cross key pad member 130, that is, by simultaneously pressing two adjacent pressing portions among the pressing members 132A, 132B, 132C, and 132D of the cross key pad 132 to cause two adjacent pressing amount detection sensors to simultaneously react.

As a result, in this embodiment, the user can give inputs in eight directions by operating the cross key pad 132. The inputs in the eight directions are exclusively related to game operations.

The cross key pad 132 in this embodiment has a configuration in which the cross key pad 132 is placed on the circular plate portion 131 as described above.

However, the cross key pad 132 is not required to include the circular plate portion 131 exposed above the casing 110, and moreover, the cross key pad 132 may not include the circular plate portion 131. This is because, even in such cases, the rod-shaped pressing members 132A, 132B, 132C, and 132D, which extend in four symmetric directions from a predetermined point and are used to give inputs by pressing the pressing portions at the distal ends thereof, are present.

Figure 2:
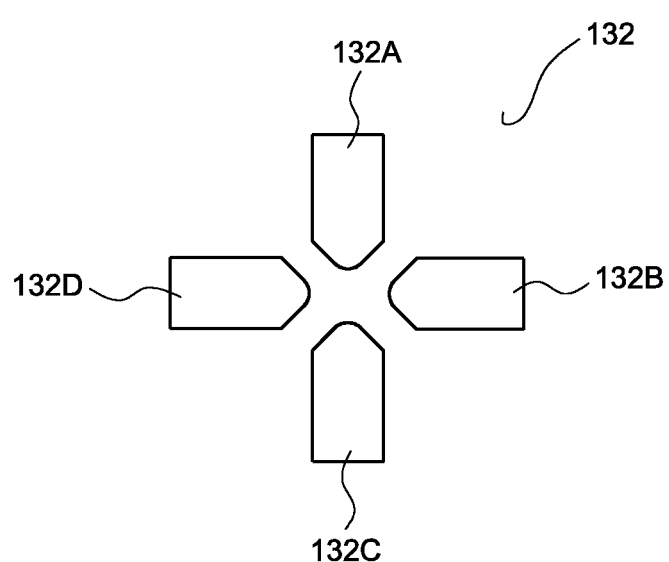
FIG. 2 is a plan view of a cross key pad in another example.

Further, for example, even a case like that of the PlayStation released by Sony Computer Entertainment Inc. in 1994, in which, when viewed from above, the base ends of the pressing members 132A, 132B, 132C, and 132D are separated from each other, and each of the pressing members 132A, 132B, 132C, and 132D is like an independent push button (see FIG. 2) is considered to be a cross key pad of the invention of the subject application. This is because, even in such cases, the rod-shaped pressing members 132A, 132B, 132C, and 132D, which extend in four symmetric directions from a predetermined point and are used to give inputs by pressing the pressing portions at the distal ends thereof, are present.

At an upper part in the left side portion of the upper surface of the casing 110, there is provided a second stick input device 141 being an input device of the stick type. The second stick input device 141 has a configuration which is similar to that of the first stick input device 121, and a user can give a desired input through operation of the second stick input device 141.

At the left side portion of the back surface of the casing 110, a trigger button 143 is provided. The trigger button 143 is similar to the trigger button 123. A user can give an input, which exclusively relates to operation of a game, through operation of the trigger button 143.

A connection cord 150 is connected to the back surface of the casing 110. The connection cord 150 is depicted in a state of being cut in the middle part thereof. The connection cord 150 is a cord including a cable for transmitting an input given by the controller 100 to a game machine (not shown).

As is well known, it is not always required that transmission of an input given by the controller to the game machine be performed by wire as in the case of using the connection cord 150. When the transmission of the input is to be performed in a wireless manner, the connection cord 150 can be omitted.

In the casing 110, there are provided sensors having a function of generating signals based on inputs from a large number of input devices including the first stick input device 121, the four push buttons 122A, 122B, 122C, and 122D of the first push-button input module 122, the trigger button 123, the second stick input device 141, the cross key pad member 130 (or cross key pad 132), and the trigger button 143. Each sensor, with the exception of the pressing amount detection sensor described later for giving inputs from the cross key pad member 130, can employ a publicly known or well-known technology in the field of controllers used in combination with a game machine. In this embodiment, such publicly known or well-known technology is employed, although not limited thereto. Therefore, description of the sensors corresponding to the first stick input device 121, the four push buttons 122A, 122B, 122C, and 122D of the first push-button input module 122, the trigger button 123, the second stick input device 141, and the trigger button 143 is omitted.

Further, the casing 110 includes a circuit board having a function of receiving an input from each of the above-mentioned sensors including the pressing amount detection sensor described later for performing inputs from the cross key pad member 130, and outputting signals exclusively for video game operations to the game machine (not shown) through the connection cord 150. At least with respect to hardware, the circuit board may be similar to a circuit board included in related-art controllers.

As described above, the cross key pad 132 in the cross key pad member 130 includes four pressing members 132A, 132B, 132C, and 132D, the distal end of which is the pressing portion referred to in the invention of the subject application.

In addition, a pressing amount detection sensor 190 is provided in the casing 110 under each pressing portion.

The pressing amount detection sensor 190 generates pressing amount data for identifying the amount of pressing when the pressing portion is pressed down. The pressing amount detection sensor 190 is configured, for example, as illustrated in FIG. 3.

Figure 3:
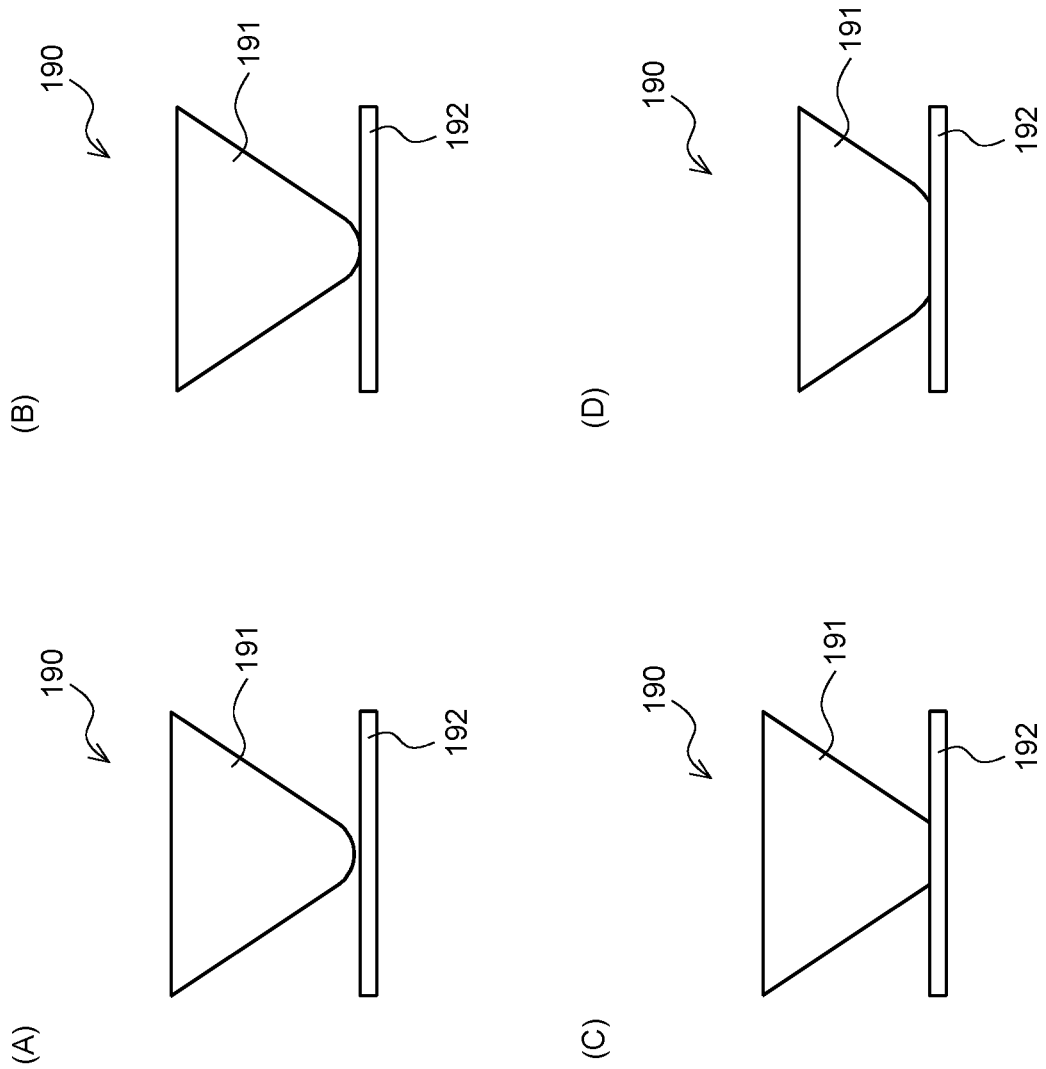
FIG. 3 is a side view for illustrating a principle of a pressing amount detection sensor included in the controller illustrated in FIG. 1.

As illustrated in FIG. 3, the pressing amount detection sensor 190 includes a conductor 191 which has a substantially downward conical shape and moves downward when the pressing portion of the cross key pad 132 is pressed down, and a circular electrode 192 which is positioned immediately below the conductor 191, and is arranged so that there is a slight gap to the distal end of the conductor 191 when, for example, the pressing portion is not pressed down with the axis of the substantially conical conductor 191 passing through the center of the circular electrode 192. The conductor 191 is made of a conductive elastic material such as conductive rubber, which is rubber to which carbon powder is added, and the electrode 192 is made of a conductive metal.

The conductor 191 in the pressing amount detection sensor 190 is not in contact with the electrode 192 when the pressing portion is not pressed down (part (A) of FIG. 3), but comes into contact with the electrode 192 when the pressing portion is pressed down (part (B) of FIG. 3). When the pressing portion is further pressed down, the surface area in contact with the electrode 192 increases while the lower end is crushed (part (C) and part (D) of FIG. 3). For example, when a current is caused to flow between the conductor 191 and the electrode 192, the electrical resistance of the contact portion changes based on the change in the contact area between the conductor 191 and the electrode 192. Therefore, through measurement of the electrical resistance, it is possible to detect the contact area between the conductor 191 and the electrode 192, and thus how much the pressing portion is pressed down.

Based on this principle, in this embodiment, the pressing amount detection sensor 190 detects the amount of pressing down the pressing portion, and based on this, pressing amount data is generated. The pressing amount data may be analog data, or digital data of, for example, 256 levels of from 00 to FF in hexadecimal notation. At the very least, the pressing amount data is required to be multilevel data. In this embodiment, the pressing amount data is in 256 levels of from 00 to FF in hexadecimal notation, but for ease of understanding, the pressing amount data is described as data of from 0 to 255 in decimal notation.

The principle by which the pressing amount detection sensor 190 detects the pressing amount of the pressing portion of the cross key pad 132 is not limited to the above description. Many such publicly known or well-known technologies exist, and hence it is possible to detect the pressing amount of the pressing portion by applying an appropriate publicly known or well-known technology for the pressing amount detection sensor 190.

Figure 4:
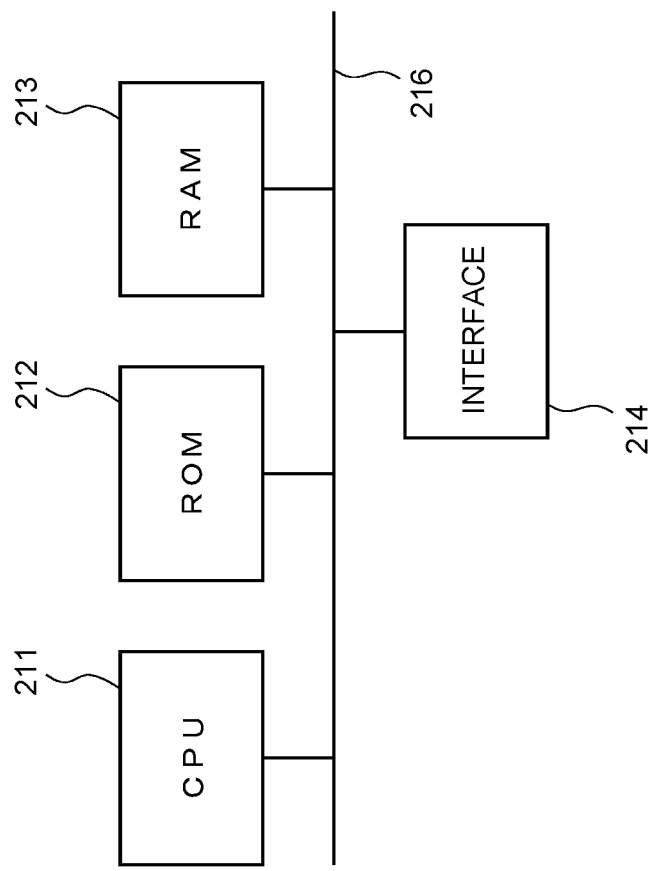
FIG. 4 is a hardware configuration diagram of a circuit board included in the controller illustrated in FIG. 1.

A configuration diagram of the hardware included in the circuit board is illustrated in FIG. 4.

The hardware includes a central processing unit (CPU) 211, a read-only memory (ROM) 212, a random-access memory (RAM) 213, and an interface 214, which are mutually connected to one another by a bus 216.

The CPU 211 is an arithmetic device for performing an arithmetic operation. The CPU 211 executes processing described later by executing, for example, a computer program recorded in the ROM 212 or the RAM 213.

The computer program referred to here includes at least a computer program for causing the CPU 211 to execute processing described later required in order for the controller of this embodiment to function as the controller of the invention of the subject application. The computer program may have been pre-installed or post-installed in the controller. The computer program may be installed in the controller via a predetermined recording medium (not shown), for example, via a game machine, or via a network, such as a LAN or the Internet. As a matter of course, the computer program may include other computer programs other than the above-mentioned computer program.

The ROM 212 records computer programs and data required in order for the CPU 211 to execute the processing described later.

The RAM 213 provides a work area required in order for the CPU 211 to perform processing. In some cases, (at least part of) the above-mentioned computer programs and data may be recorded or temporarily recorded.

The interface 214 exchanges data between the CPU 211, the RAM 213, and the like connected by the bus 216 and the outside. At least the cable in the connection cord 150 and the sensors corresponding to each input device (including the pressing amount detection sensor 190 corresponding to each of the four pressing portions of the cross key pad 132) are connected to the interface 214.

The data input from each sensor, which is described later, is transmitted to the bus 216 via the interface 214. Further, the data generated by the CPU 211, which is described later, is transmitted to the cable in the connection cord 150 via the interface 214, and as a result is transmitted to the game machine (not shown).

Figure 5:
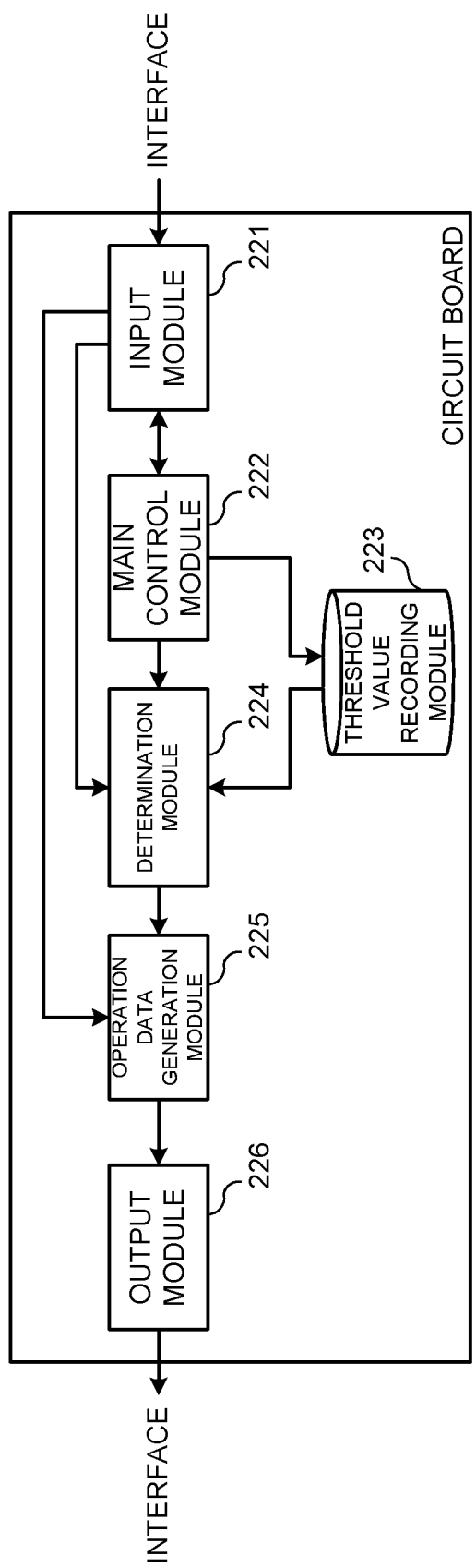
FIG. 5 is a block diagram for illustrating functional blocks generated in the circuit board included in the controller illustrated in FIG. 1.

The CPU 211 executes the computer programs, and hence functional blocks illustrated in FIG. 5 are generated in the controller 100. The following functional blocks may be generated by the function of the above-mentioned computer program alone for causing the controller in this embodiment to execute the following processing required in order to function as the controller 100 of the invention of the subject application, or may be generated based on cooperation between the computer program and another computer program.

In terms of the functions of the invention of the subject application, an input module 221, a main control module 222, a threshold value recording module 223, a determination module 224, an operation data generation module 225, and an output module 226 are generated in the circuit board of the controller 100.

The input module 221 receives inputs from the interface 214.

Data from sensors corresponding to various input devices is included in the inputs from the interface 214 to the input module 221. The data includes the pressing amount data from the pressing amount detection sensor 190 associated with each pressing portion of the cross key pad 132.

When the input module 221 receives the data, the data is transmitted to any one of the main control module 222, the determination module 224, and the operation data generation module 225. Specifically, setting mode start data, game mode start data, and setting data, which are described later, are transmitted to the main control module 222, the pressing amount data is transmitted to the determination module 224, and the data from each of the sensors during game execution is transmitted to the operation data generation module 225.

The main control module 222 performs overall control of the above-mentioned functional blocks generated in the controller 100.

For example, as described above, the main control module 222 may receive setting mode start data and game mode start data. When the main control module 222 receives setting mode start data, the main control module 222 starts a setting mode described later, and when the main control module 222 receives game mode start data, the main control module 222 starts a game mode described later. When the game mode is started, the main control module 222 instructs the input module 221 to transmit the pressing amount data from the four pressing amount detection sensors 190 corresponding to the cross key pad 132 to the determination module 224, and to transmit the data from the sensors corresponding to the other input devices to the operation data generation module 225.

When the setting mode is started, setting data is transmitted to the main control module 222. The setting data is data for setting a threshold value, which is described later. When the setting data is received, the main control module 222 transmits the setting data to the threshold value recording module 223, records the threshold value data in the threshold value recording module 223, or rewrites the existing threshold value data.

The threshold value recording module 223 is configured to record the threshold value data as described above. The specific contents of the threshold value data are described later.

Further, the threshold value data recorded in the threshold value recording module 223 is read out by the determination module 224 at a timing described later.

When the game mode is to be executed, the determination module 224 may receive the pressing amount data transmitted via the interface 214 and the input module 221 from the pressing amount detection sensor 190 corresponding to each of the four pressing portions of the cross key pad 132.

When this pressing amount data is received, the determination module 224 determines whether or not to recognize that there has been an input based on the pressing amount data. When the game mode is to be executed, the determination module 224 reads the threshold value data from the threshold value recording module 223. When the determination described above is performed, the determination module 224 uses the threshold value data read from the threshold value recording module 223. The specific determination method executed by the determination module 224 is described later.

The determination module 224 is configured to transmit, when it is recognized that there has been an input based on the pressing amount data, data indicating that there has been an input as well as data for identifying the pressing portion for which an input is recognized to the operation data generation module 225.

As described above, the operation data generation module 225 may receive, from the determination module 224, the data indicating that there has been an input as well as the data for identifying the pressing portion for which an input based on the pressing amount data is recognized. When the data is received, the operation data generation module 225 generates operation data for the input from the cross key pad 132.

Further, when the game mode is executed, the operation data generation module 225 may receive an input of data transmitted via the interface 214 and the input module 221 from sensors corresponding to input devices other than the cross key pad 132. When the operation data generation module 225 receives this data, the operation data generation module 225 generates operation data based on the received data.

Operation data is the data which is required in order to execute a game, and is transmitted from the controller 100 to the game machine executing the video game. The specific contents of the operation data are described later.

After the operation data generation module 225 generates the operation data, the operation data generation module 225 transmits the generated operation data to the output module 226.

As described above, the output module 226 may receive the operation data from the operation data generation module 225. When the operation data is received, the output module 226 transmits the received operation data to the interface 214. The operation data output from the output module 226 is transmitted from the interface 214 to the game machine via the cable in the connection cord 150.

Description is given of a method of using the controller 100 described above, and an operation of the controller 100.

When the controller 100 is used, the connection cord 150 of the controller 100 is connected to the game machine (not shown). The connection may be performed in a publicly known or well-known manner. As already described, the connection may be a wireless connection. When the controller 100 and the game machine are to be wirelessly connected, as a matter of course, the controller 100 and the game machine are both provided with wireless communication modules that can be configured by using publicly a known or well-known technology.

When this controller 100 is used, first, the setting mode is executed.

In this embodiment, the setting mode is started by inputting a command determined in advance by using some of the input devices, although the method of starting the setting mode is not limited to this. For example, although not limited to this, in this embodiment, the setting mode is started by pressing the group of four push buttons 122A, 122B, 122C, and 122D twice each in the stated order within 3 seconds. When the user presses the push buttons 122A, 122B, 122C, and 122D twice each in the stated order, the sensors under each push button 122A, 122B, 122C, and 122D react, and generate setting mode start data. The setting mode start data is transmitted via the interface 214 to the input module 221, and is then transmitted from the input module 221 to the main control module 222.

The main control module 222 receives the setting mode start data, and starts the setting mode.

In the setting mode, the user sets four threshold values for the up, down, left, and right directions for determining, when only one pressing portion of the distal end of each of the up pressing member 132A, the right pressing member 132B, the down pressing member 132C, and the left pressing member 132D is pressed, the pressing amount (amount of pressing down) that is required in order for the determination module 224 to determine that there has been an input from a pressing member 132A, 132B, 132C, or 132D which has been pressed down.

In addition, the user sets four threshold values for the upper right, lower right, lower left, and upper left directions for determining, when two pressing portions of the distal ends of each of the up pressing member 132A, the right pressing member 132B, the down pressing member 132C, and the left pressing member 132D are pressed, the pressing amount (amount of pressing down) of the two pressing portions that is required in order for the determination module 224 to determine that there has been an input in a diagonal direction between two adjacent pressing portions from among the pressing members 132A, 132B, 132C, and 132D which have been pressed down.

The user inputs the threshold value by using an appropriate one of the various input devices. In this embodiment, for example, the user can set the threshold value by using push buttons 122A, 122B, 122C, and 122D, although the invention of the subject application is obviously not limited thereto.

In this embodiment, when the left and right push buttons 122B and 122D are pressed, it is possible to determine which of the eight above-mentioned threshold values is to be input. Further, through pressing of the up and down push buttons 122A and 122C, the magnitude of the selected threshold value to be set can be selected. This control is performed by the main control module 222 which receives inputs from the sensor associated with each of the push buttons 122A, 122B, 122C, and 122D via the interface 214 and the input module 221.

Figure 6:
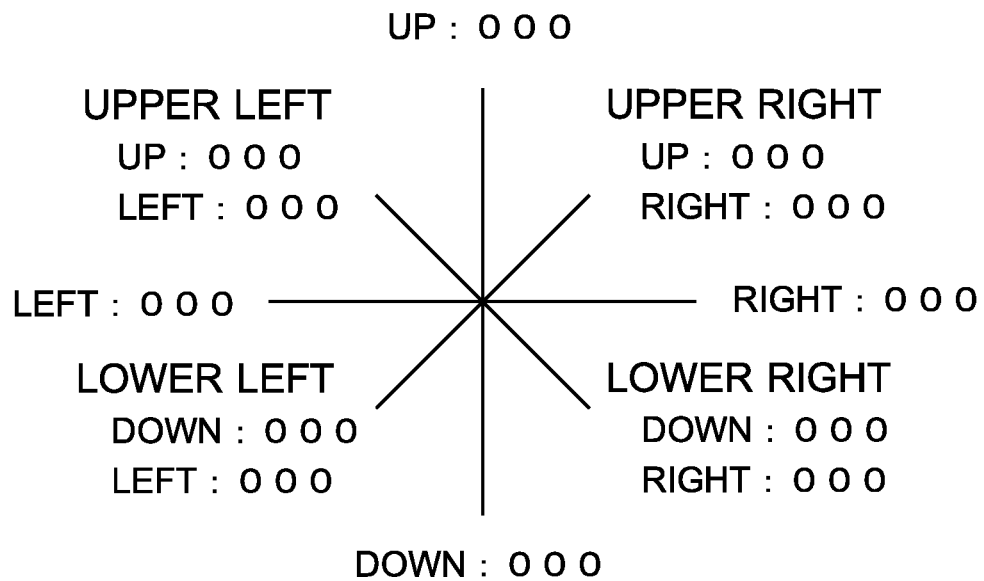
FIG. 6 is a diagram for illustrating an example of an image displayed on a display connected to a game machine when a setting mode is executed.

In this embodiment, when the setting mode is executed by the controller 100, a television receiver or another display connected to the game machine displays, for example, an image as illustrated in FIG. 6, although the invention of the subject application is not limited to this. The image is for assisting the user in inputting the setting data, which is data for setting the threshold values.

The data of the image illustrated in FIG. 6 displayed on the display may be generated by the controller 100. For example, the main control module 222 of the controller 100 may generate the image data, output the image data to the game machine through the output module 226, the interface 214, and the cable in the connection cord 150, and display the image on the display through the game machine. Further, a computer program for displaying an image as illustrated in FIG. 6 on the display can be installed in the game machine so as to allow the game machine to display the image as illustrated in FIG. 6 on the display.

On the display, the instruction "Please set all threshold values to between 0 and 255" is displayed. Further, on the display, the four directions of up, down, left, and right, and the values of the threshold values associated with those four directions in, for example, decimal notation are displayed. The initial value of each value is 0, as illustrated in FIG. 6. In addition, on the display, four diagonal directions of upper right, lower right, lower left, and upper left, and the values of the threshold values associated with those four diagonal directions are displayed in, for example, decimal notation. The initial value of each value is 0, as illustrated in FIG. 6. The initial values of the four diagonal directions of upper right, lower right, lower left, and upper left are each associated with the two adjacent directions positioned on both sides thereof. For example, for the upper right direction, the associated two adjacent directions are the up threshold value and the right threshold value.

When the user presses the right push button 122B, the threshold value to be set is changed clockwise one by one. For example, every time the user presses the right push button 122B, the threshold value to be set changes from the up threshold value to the upper-right up threshold value, the upper-right right threshold value, the right threshold value, the lower-right lower threshold value, the lower-right right threshold value, and so on. Conversely, when the user presses the left push button 122D, the threshold value which is then set is changed counterclockwise one by one.

For example, there may be a case in which the user has selected the up threshold value. At that time, when the user presses the up push button 122A, the up threshold value increases from 0. Further, when the down push button 122C is pressed, the up threshold value decreases. As a result, the user can set the up threshold value to any value.

In the same way, the user sets the upper-right up threshold value and the upper-right right threshold value, and also sets the right threshold value. By repeating this operation, the user sets all 12 threshold values illustrated in FIG. 6. For example, the user can set the threshold values as illustrated in FIG. 7. As described above, in this embodiment, there are 12 threshold values to be set by the user. The 12 threshold values are independent of each other, and all 12 threshold values can be set to any value desired by the user within a defined range of from 0 to 255.

The values of the selected threshold values and the threshold value being set are displayed on the display. The user can set the threshold values while viewing the display.

Each time the user sets a threshold value, setting data, which is data for identifying the threshold value, is transmitted from the sensors corresponding to the up and down push buttons 122A and 122C to the main control module 222 via the interface 214 and input module 221.

Each time the main control module 222 receives the setting data, which is data for identifying the value of the threshold value, the main control module 222 records the data in the threshold value recording module 223. When a threshold value already existed in the threshold value recording module 223, the threshold value is overwritten.

An example of data recorded in the threshold value recording module 223 is schematically illustrated in FIG. 8.

As illustrated in FIG. 8, one threshold value is recorded in association with each of the up, down, left, and right directions. In a case in which only one pressing portion at the distal end of the up pressing member 132A is pressed, the threshold value regarding a pressing amount (amount of pressing down) used by the determination module 224 to determine that there has been an input from the pressing member 132A which has been pressed down is the "051" associated with "up." In other words, each threshold value recorded in the threshold value recording module 223 is recorded in association with the position of the pressing portion. The same applies for the other directions.

As illustrated in FIG. 8, two threshold values are recorded in association with each of the upper-right, lower-right, lower-left, and upper-left directions. In a case in which the up pressing member 132A and the right pressing member 132B are both pressed simultaneously, the threshold values regarding a pressing amount (amount of pressing down) of the two pressing members used by the determination module 224 to determine that there has been an input in a diagonal direction (upper-right) between the up pressing member 132A and the right pressing member 132B which have been pressed down are the "170" associated with "up" and the "160" associated with "right." In other words, in this case as well, each threshold value recorded in the threshold value recording module 223 is recorded in association with the position of the pressing portion. The same applies for the other directions.

When all 12 threshold values have been recorded in the threshold value recording module 223 in the manner described above, the setting mode ends.

In order to end the setting mode, an appropriate command similar to the command used when the setting mode start data is input may be determined in advance, and the setting mode may be ended when the user inputs the command.

In the example described above, the setting data is written from any one of the input devices included in the controller 100 to the threshold value recording module 223 of the controller 100. That is, the data relating to the threshold value to be recorded in the threshold value recording module 223 is input by using an input device provided in the controller 100.

However, as a different method, it is possible to use a smartphone, which is typically a personal item of the user, to input the data relating to the threshold value to be recorded in the threshold value recording module 223 of the controller 100. In that case, it is required that the smartphone and the controller 100 be connected to each other such that data can be transmitted and received. In recent years, smartphones are usually equipped with a short-range wireless communication function, typically a communication mechanism based on a standard, such as Bluetooth (trademark) or Wi-Fi. Therefore, through provision of a communication mechanism capable of communication to and from the smartphone on the controller 100 side as well, the smartphone and the controller 100 can communicate to and from each other.

Further, through use of an input mechanism (typically, a touch panel display) originally provided in the smartphone as the device for inputting the data relating to the threshold value, similarly to the input device of the controller 100, the input data can be transferred from the smartphone to the controller 100. The communication mechanism included in the controller 100 is connected to the interface 214, and the data received by the controller 100 is written from the interface 214 to the threshold value recording module 223 via the input module 221 and the main control module 222.

Thus, in the setting mode, it is also possible to write the 12 threshold values to the threshold value recording module 223 by using a smartphone.

Next, the game mode is described.

The game mode is started by inputting the game mode start data. When the user operates a predetermined input device of the controller 100, the game mode start data is generated by a sensor that exists corresponding to the input device. The game mode start data is transmitted from the interface 214 through the input module 221 to the main control module 222.

The main control module 222 receives the game mode start data, and when pressing amount data is received from the pressing amount detection sensor 190 corresponding to the four pressing portions of the cross key pad 132 via the interface 214, the main control module 222 instructs the input module 221 to transmit the received pressing amount data to the determination module 224, and when data is received from a sensor corresponding to another input device via the interface 214, the main control module 222 instructs the input module 221 to transmit the received data to the operation data generation module 225.

Further, when the game mode is to be executed, the main control module 222 instructs the determination module 224 to read out the data of the 12 threshold values regarding the threshold values described above from the threshold value recording module 223 together with the data on the pressing portion sites with which each of those threshold values is associated. Based on this instruction, the determination module 224 reads out the data of the 12 threshold values from the threshold value recording module 223 together with the data on the pressing portion sites with which each of those threshold values is associated.

When the game machine executes the video game, the user operates various input devices provided on the controller in order to give inputs corresponding to the progress of the game. The input devices include the cross key pad member 130 and the cross key pad 132, and also includes other input devices.

As described above, when the input module 221 receives data via the interface 214 from a sensor corresponding to an input device other than the cross key pad 132, the input module 221 transmits the data to the operation data generation module 225. The operation data generation module 225 generates operation data indicating what kind of input has been given from each input device based on the received data, and transmits the generated operation data to the output module 226. When there is no particular requirement to make changes, the operation data generated by the operation data generation module 225 may be the data itself received from the input module 221. In other words, in this case, the operation data generation module 225 simply passes the data received from the input module 221 to the output module 226.

The output module 226 transmits the received operation data to the game machine via the interface 214 and the cable in the connection cord 150.

The game machine receives the operation data, and executes the video game based on the operation data.

The above-mentioned processing executed when the input module 221 receives data from a sensor corresponding to an input device other than the cross key pad 132 via the interface 214 may be the same as publicly known or well-known processing executed by a related-art controller, and in this embodiment, the processing is executed in such a manner but is not limited thereto.

When the input module 221 receives the pressing amount data from the pressing amount detection sensors 190 corresponding to the four pressing portions of the cross key pad 132 via the interface 214, the pressing amount data is transmitted to the determination module 224.

As described above, when the game mode is executed, the determination module 224 reads out the data of the 12 threshold values from the threshold value recording module 223 together with the data relating to the pressing portion sites with which each of those threshold values is associated.

For example, there may be a case in which, in the cross key pad 132, only the distal end of the pressing member 132A forming the cross key pad 132 is pressed, that is, only the up pressing portion is pressed, pressing amount data is transmitted from only the pressing amount detection sensor 190 provided corresponding to the up pressing portion. In this case, as described above, the pressing amount data is numeric data of from 0 to 255, and this data indicates how much the pressing portion has been pressed down.

When the determination module 224 receives the pressing amount data, the determination module 224 compares the threshold value (in the example illustrated in FIG. 8, 051) associated with the position of the pressing portion corresponding to the pressing amount detection sensor 190 which has generated the pressing amount data with the value identified by the received pressing amount data, and when the value identified by the pressing amount data is equal to or more than the threshold value, the determination module 224 generates data indicating that there has been an input, and transmits the generated data together with the data of the position of the pressing portion to the operation data generation module 225. Meanwhile, when the value identified by the pressing amount data is less than the threshold value, the determination module 224 does not generate data indicating that there has been an input.

When the determination module 224 generates data indicating that there has been an input and transmits the data together with the data of the position of the pressing portion to the operation data generation module 225, the operation data generation module 225 generates data indicating the pressing portion of the cross key pad 132 from which there has been an input (for example, up has been turned ON), and transmits the generated data to the output module 226. The output module 226 transmits the data to the game machine via the interface 214 and the cable in the connection cord 150. The game machine receives the data indicating the pressing portion of the cross key pad 132 from which there has been an input, and as a result executes the video game based on the data.

The same processing is executed also in cases in which only any one of the right, down, or left pressing portion of the cross key pad 132 is pressed so that pressing amount data is received only from the one pressing amount detection sensor 190 provided corresponding to the pressed pressing portion.

For example, as exemplified in this embodiment, when the threshold value of the up pressing portion of the cross key pad 132 is 051, and the pressing amount data transmitted to the determination module 224 from the pressing amount detection sensor 190 corresponding to the up pressing portion of the cross key pad 132 is 55, the determination module 224 generates data indicating that there has been an input, and transmits the generated data to the operation data generation module 225. Based on this, the operation data generation module 225 generates data indicating that the up pressing portion has been turned ON (this is binary data of ON or OFF), and outputs the generated data to the game machine.

When the sensor corresponding to the up pressing portion of the cross key pad 132 is a binary sensor of ON or OFF as in the related art, the pressing portion remains in a non-pressed state until the sensor is pressed far enough to be turned ON, and hence data indicating that the up pressing portion has been turned ON is not output from the controller 100 to the game machine. For example, in a case in which the sensor is not turned on until the pressing portion is pressed by about half, in the example of this embodiment, data indicating that the up pressing portion has been turned ON is not output from the controller 100 to the game machine until the up pressing portion of the cross key pad 132 is pressed enough to generate pressing amount data of about half of 0 to 255, that is, about 128. In contrast, in a case in which the threshold value of the up pressing portion of the cross key pad 132 is set to a low value of 051, even when the user presses the up pressing portion of the cross key pad by only a small amount, as long as the pressing amount data is equal to or more than the threshold value of 51, data indicating that the up pressing portion has been turned ON is transmitted from the controller 100 to the game machine.

In other words, as the threshold value of the up pressing portion of the cross key pad 132 is set to a lower value, the up pressing portion of the cross key pad 132 becomes more responsive to the pressing operation performed by the user, and as the threshold value of the up pressing portion of the cross key pad 132 is set to a higher value, the up pressing portion of the cross key pad 132 becomes less responsive to the pressing operation performed by the user. The user may be good at or not good at operating the cross key pad 132, or have a particular habit or preference for how to operate the cross key pad 132. The user can freely determine the up, down, left, and right threshold values of the cross key pad 132 in accordance with such circumstances.

The threshold values illustrated in FIG. 8 are: up 051, right 040, down 040, and left 062. Therefore, of the pressing portions of the cross key pad 132, the right and down pressing portions are the most responsive to a press by the user, followed by the up pressing portion and the left pressing portion in the stated order.

For example, there may be a case in which, in the cross key pad 132, the distal end of each of the pressing member 132A and the pressing member 132B forming the cross key pad 132 is pressed simultaneously, that is, the up pressing portion and the right pressing portion are pressed simultaneously, pressing amount data is simultaneously transmitted from the pressing amount detection sensor 190 provided corresponding to the up pressing portion and from the pressing amount detection sensor 190 provided corresponding to the right pressing portion.

When the determination module 224 receives the two pieces of pressing amount data, the determination module 224 compares the threshold values (in the example illustrated in FIG. 8, up: 170, right: 160) associated with the positions of the two pressing portions in the direction (in this example, upper right) of the positions sandwiched by the pressing amount detection sensors 190 which have generated the two pieces of pressing amount data with the values identified by the received pressing amount data, and when both of the values identified by the pressing amount data are equal to or more than the corresponding threshold values, generates data indicating that there has been an input, and transmits the generated data together with the data of the position of the pressing portion to the operation data generation module 225. Meanwhile, when at least one of the two values identified by the pressing amount data is less than the corresponding threshold value, the determination module 224 does not generate data indicating that there has been an input.

When the determination module 224 generates data indicating that there has been an input and transmits the data together with the data of the position of the pressing portion to the operation data generation module 225, the operation data generation module 225 generates data indicating the pressing portion of the cross key pad 132 from which there has been an input (for example, upper right has been turned ON), and transmits the generated data to the output module 226. The output module 226 transmits the data to the game machine via the interface 214 and the cable in the connection cord 150. The game machine receives the data indicating the pressing portion of the cross key pad 132 from which there has been an input, and as a result executes the video game based on the data.

Similar processing is executed also when the two pressing portions of down and right, down and left, or up and left of the cross key pad 132 are simultaneously pressed, and two pieces of pressing amount data are simultaneously transmitted from the two pressing amount detection sensors 190 provided corresponding to each of those two pressed pressing portions.

For example, as exemplified in this embodiment, there may be a case in which, regarding the upper-right input, the threshold value for the up pressing portion of the cross key pad 132 is 170 and the threshold value for the right pressing portion is 160, and both of the pieces of pressing amount data transmitted to the determination module 224 from the two pressing amount detection sensors 190 corresponding to the up and right pressing portions of the cross key pad 132 are 165. In this case, the value identified by the pressing amount data transmitted from the up pressing amount detection sensor 190 is 165, which is smaller than the threshold value of 170 for the up pressing portion, and hence the determination module 224 does not generate data indicating that there has been an input. For example, when the values identified by the pressing amount data transmitted to the determination module 224 from two pressing amount detection sensors 190 corresponding to the up and right pressing portions of the cross key pad 132 are 190 and 175, the value identified by the pressing amount data transmitted from the up pressing amount detection sensor 190 is equal to or more than the up threshold value, and the value identified by the pressing amount data transmitted from the right pressing amount detection sensor 190 is equal to or more than the right threshold value, and hence the determination module 224 generates data indicating that there has been an input.

When the determination module 224 has generated data indicating that there has been an input, the determination module 224 transmits the generated data to the operation data generation module 225. Based on this, the operation data generation module 225 generates data indicating that the upper-right input has been turned ON (this is binary data of ON or OFF), and outputs the generated data to the game machine.

In the example illustrated in FIG. 8, the threshold value (150 to 185) for the pressing amount of each of the up, down, left, and right pressing portions in the four diagonal directions of upper right, lower right, lower left, and upper left is generally set higher than the threshold values (040 to 062) for the up, down, left, and right pressing amounts. Therefore, in a case in which the threshold values are set as illustrated in FIG. 8, when the user operates the cross key pad 132, it is generally more difficult to give inputs in the four diagonal directions than inputs in the four directions of up, down, left, and right. However, this is not required to be the case, and it is also possible to set such that the inputs in the four diagonal directions are generally easier than the inputs in the four directions of up, down, left, and right.

As a matter of course, the user can freely set the ease of inputs in the four directions of up, down, left, and right, and the ease of inputs in the four diagonal directions in accordance with his or her strengths, weaknesses, habits, and preferences.

REFERENCE SIGNS LIST

110 casing
130 cross key pad member
132 cross key pad
132A pressing member
132B pressing member
132C pressing member
132D pressing member
190 pressing amount detection sensor
221 input module
222 main control module
223 threshold value recording module
224 determination module
225 operation data generation module
226 output module

The invention claimed is:

1. A game machine controller, comprising:
a casing to be grasped by a user by a hand;
a cross key pad mounted to the casing, the cross key pad including rod-shaped pressing members, each of the rod-shaped pressing members extending in one of four symmetrical directions from a predetermined point and being configured to receive an input when a pressing portion at a distal end thereof is pressed;
a control module configured to generate, when any one of four of the pressing portions is pressed, ON data including position data for identifying the pressing portion which has been pressed; and
an output module configured to output the ON data generated by the control module,
the game machine controller being configured to be used in combination with a game machine configured to receive the ON data as an input from the cross key pad,
the game machine controller further comprising:
 a pressing amount detection sensor provided on each of the pressing portions, the pressing amount detection sensor being configured to detect a pressing amount when the pressing portion is pressed and to generate pressing amount data which is data for identifying the pressing amount;
 a threshold value recording module configured to record a threshold value set by the user for the pressing amount data in association with each of the pressing portions; and
 a wireless communication module configured to wirelessly receive data for recording the threshold value in the threshold value recording module, wherein the wireless communication module is configured to receive the data for recording the threshold value in the threshold value recording module from a smartphone;
wherein the control module is configured to generate, based on pressing of one of the pressing portions, the ON data when the pressing amount data received from the pressing amount detection sensor provided in the pressing portion is equal to or more than the threshold value recorded in the threshold value recording module in association with the pressing portion corresponding to the pressing amount detection sensor which has generated the pressing amount data.

2. A game machine controller, comprising:
a casing to be grasped by a user by a hand;
a cross key pad mounted to the casing, the cross key pad including rod-shaped pressing members, each of the rod-shaped pressing members extending in one of four symmetrical directions from a predetermined point and being configured to receive an input when a pressing portion at a distal end thereof is pressed;
a control module configured to generate, when any one of four of the pressing portions is pressed, ON data including position data for identifying the pressing portion which has been pressed; and
an output module configured to output the ON data generated by the control module;
the game machine controller being configured to be used in combination with a game machine configured to receive the ON data as an input from the cross key pad;
the game machine controller further comprising:
 a pressing amount detection sensor provided on each of the pressing portions, the pressing amount detection sensor being configured to detect a pressing amount when the pressing portion is pressed and to generate pressing amount data which is data for identifying the pressing amount; and
 a threshold value recording module configured to record a threshold value set by the user for the pressing amount data in association with each of the pressing portions,
wherein the control module is configured to generate, based on pressing of one of the pressing portions, the ON data when the pressing amount data received from the pressing amount detection sensor provided in the pressing portion is equal to or more than the threshold value recorded in the threshold value recording module in association with the pressing portion corresponding to the pressing amount detection sensor which has generated the pressing amount data;
wherein the control module is configured to generate, when two adjacent pressing portions of the cross key pad are pressed simultaneously, ON data including position data corresponding to a diagonal direction which is a direction between the two adjacent pressing portions;
wherein the threshold value recording module is configured to record threshold values set by the user for four diagonal directions as a pair relating to the pressing amount data from two pressing amount detection sensors provided at positions sandwiching each of the four diagonal directions in association with the each of the four diagonal directions; and
wherein the control module is configured to generate, based on simultaneous pressing of two adjacent pressing portions, the ON data for a diagonal direction when two pieces of pressing amount data received from the pressing amount detection sensor provided in each of the two adjacent pressing portions are equal to or more than both of the threshold values recorded in the threshold value recording module as a pair in association with the diagonal direction corresponding to the two adjacent pressing portions corresponding to the two pressing amount detection sensors which have generated the two pieces of pressing amount data.

3. The game machine controller according to claim 1, further comprising a threshold value input device configured to record the threshold value in the threshold value recording module.

4. A method to be executed by a control module of a game machine controller,
the game machine controller including:
 a casing to be grasped by a user by a hand;
 a cross key pad mounted to the casing, the cross key pad including rod-shaped pressing members, each of the rod-shaped pressing members extending in one of four symmetrical directions from a predetermined point and being configured to receive an input when a pressing portion at a distal end thereof is pressed;
 the control module configured to generate, when any one of four of the pressing portions is pressed, ON data including position data for identifying the pressing portion which has been pressed;
 an output module configured to output the ON data generated by the control module;
 a pressing amount detection sensor provided on each of the pressing portions, the pressing amount detection sensor being configured to detect a pressing amount of a press performed on the pressing portion and to generate pressing amount data which is data for identifying the pressing amount; and
 a threshold value recording module configured to record a threshold value set by the user for the pressing amount data in association with each of the pressing portions;
 a wireless communication module configured to wirelessly receive data for recording the threshold value in the threshold value recording module, wherein the wireless communication module is configured to receive the data for recording the threshold value in the threshold value recording module from a smartphone;

the game machine controller being configured to be used in combination with a game machine configured to receive the ON data as an input from the cross key pad;

the method comprising the steps of:

receiving, by the control module, the pressing amount data from the pressing amount detection sensor provided in each of the pressing portions; and generating, by the control module, the ON data when the received pressing amount data is equal to or more than the threshold value recorded in the threshold value recording module in association with the pressing portion corresponding to the pressing amount detection sensor which has generated the pressing amount data.

5. A method to be executed by a control module of a game machine controller, the game machine controller including:

a casing to be grasped by a user by a hand;

a cross key pad mounted to the casing, the cross key pad including rod-shaped pressing members, each of the rod-shaped pressing members extending in one of four symmetrical directions from a predetermined point and being configured to receive an input when a pressing portion at a distal end thereof is pressed;

the control module configured to generate, when any one of four of the pressing portions is pressed, ON data including position data for identifying the pressing portion which has been pressed;

an output module configured to output the ON data generated by the control module;

a pressing amount detection sensor provided on each of the pressing portions, the pressing amount detection sensor being configured to detect a pressing amount of a press performed on the pressing portion and to generate pressing amount data which is data for identifying the pressing amount; and a threshold value recording module configured to record a threshold value set by the user for the pressing amount data in association with each of the pressing portions;

wherein the control module is configured to generate, when two adjacent pressing portions of the cross key pad are pressed simultaneously, ON data including position data corresponding to a diagonal direction which is a direction between the two adjacent pressing portions;

wherein the threshold value recording module is configured to record threshold values set by the user for four diagonal directions as a pair relating to the pressing amount data from two pressing amount detection sensors provided at positions sandwiching each of the four diagonal directions in association with the each of the four diagonal directions; and wherein the control module is configured to generate, based on simultaneous pressing of two adjacent pressing portions, the ON data for a diagonal direction when two pieces of pressing amount data received from the pressing amount detection sensor provided in each of the two adjacent pressing portions are equal to or more than both of the threshold values recorded in the threshold value recording module as a pair in association with the diagonal direction corresponding to the two adjacent pressing portions corresponding to the two pressing amount detection sensors which have generated the two pieces of pressing amount data;

the game machine controller being configured to be used in combination with a game machine configured to receive the ON data as an input from the cross key pad, the method comprising the steps of:

receiving, by the control module, the pressing amount data from the pressing amount detection sensor provided in each of the pressing portions; and generating, by the control module, the ON data when the received pressing amount data is equal to or more than the threshold value recorded in the threshold value recording module in association with the pressing portion corresponding to the pressing amount detection sensor which has generated the pressing amount data.

* * * * *